Feb. 20, 1951     H. L. BLOMGREN     2,542,467
SUBMERGED BEARING FOR WATER WHEELS, TURBINES OR THE LIKE
Filed March 4, 1946            2 Sheets-Sheet 2
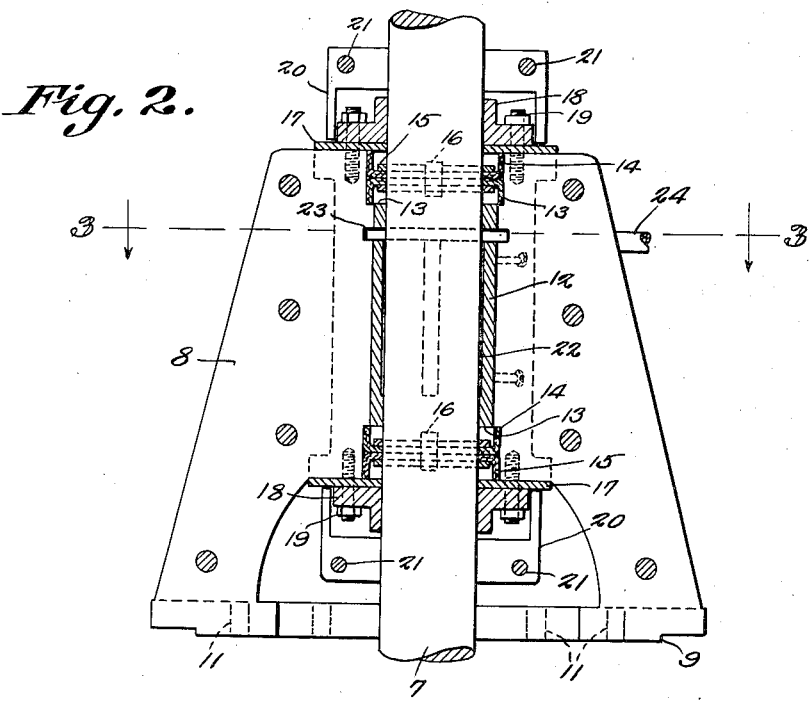
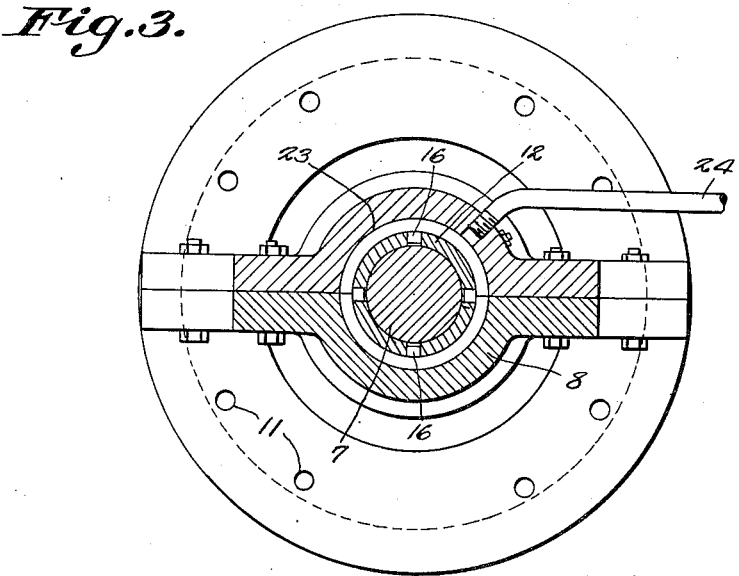
INVENTOR.
H. L. Blomgren.
BY
ATTORNEYS.

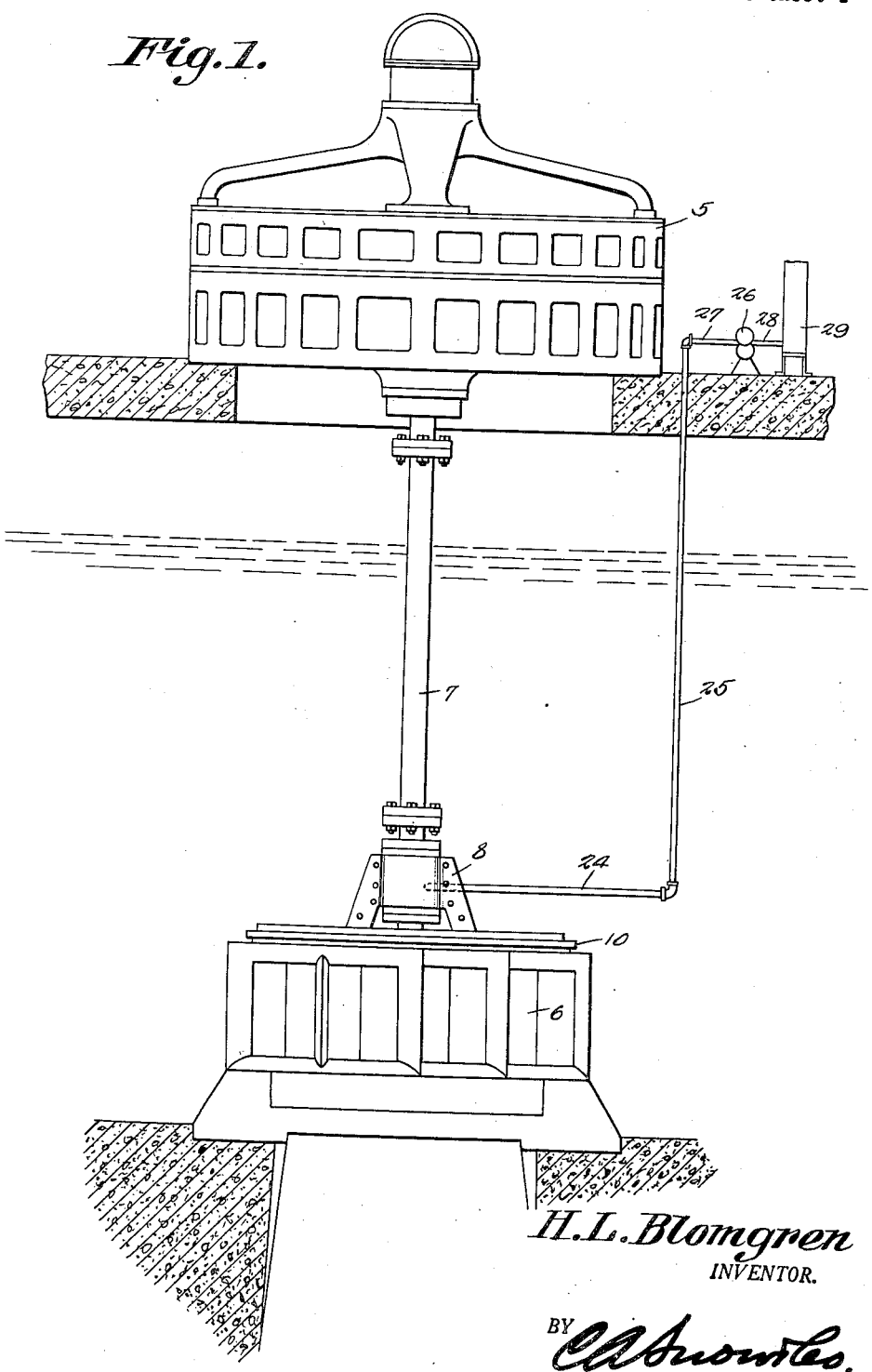

Patented Feb. 20, 1951

2,542,467

UNITED STATES PATENT OFFICE 2,542,467

SUBMERGED BEARING FOR WATER WHEELS, TURBINES, OR THE LIKE

Hjalmar L. Blomgren, Creighton, Nebr.

Application March 4, 1946, Serial No. 651,720

1 Claim. (Cl. 286—1)

This invention relates to submerged bearings for water wheels, turbines or the like, the primary object of the invention being to provide a bearing which will support the turbine shaft and propeller in a true vertical position at all times, and one which will insure against sand, silt and other foreign matter entering the bearing to damage the bearing or shaft, to such a degree as to necessitate frequent adjustment and replacements.

An important object of the invention is to provide means for supplying grease to the leathers of the bearing to cause the leathers to be forced into close contact with the bearing wall, to prevent water from entering the bearing.

With the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

Referring to the drawings

Figure 1 is an elevational view of a turbine, showing the type of water wheel or turbine used.

Figure 2 is a vertical sectional view through the bearing.

Figure 3 is a transverse sectional view taken on line 3—3 of Fig. 2.

The reference character 5 indicates the generator of a hydroelectric plant, the reference character 6 indicating the turbine or water wheel that is mounted within a body of water, to be operated by the water flowing through the turbine or water wheel.

The reference character 7 indicates the main shaft of the hydroelectric plant and on the lower end of which the turbine or water wheel 6 is mounted. The bearing is supported within the two-piece bearing housing 8 which housing is formed with a boss 9 that fits into a recess formed in the crown plate 10, the housing having openings 11 to receive cap screws that secure the bearing housing in position on the crown plate.

The reference character 12 indicates a bronze bushing which is held within the bearing housing, and in which the shaft 7 operates. Adjacent to the upper and lower ends of the bearing housing, are formed cut-out portions 13 in which the leathers 14 are held, the leathers 14 being outwardly turned, as clearly shown by Fig. 2 of the drawings, and completely cover the walls of the cut-out portions. The leathers 14 are held in place by means of the rings 15 that are riveted to the leathers, the rings 15 being keyed to the shaft 7, by means of the keys 16, so that the leathers rotate with the shaft 7. Upper and lower wear plates 17 which are circular in formation, are fitted at the ends of the bearing and are held in place by means of the collars 18 and cap screws 19. The covers 20 fit over the collars 18 and are secured in position by means of bolts which are extended through the openings 21 to draw the sections of the covers together, around the shaft 7.

Formed in the bushing 12, are grooves 22 disposed longitudinally thereof, which grooves communicate with the annular groove 23 into which one end of the pipe 24 extends, the pipe 24 being connected with the pipe 25 that has connection with the grease pump 26, through the pipe 27. A pipe 28 establishes communication between the grease pump 26 and grease supply tank 29. Thus it will be seen that due to this construction, grease may be forced through the pipes 24, 25 and 27, to enter the grooves 22 and 23, where the grease will find its way into the leathers 14, which are in the form of cups, the grease pressure together with the centrifugal force created when the shaft and leathers rotate, tending to throw the leathers outwardly against the walls of the cut-out portions, providing a fluid-tight connection at these points.

What is claimed is:

The combination with a rotating shaft and submerged bearing in which the shaft operates, of a bearing grease retainer comprising a pair of spaced collars, wear plates secured to the collars, pairs of outer and inner cup-shaped washers disposed adjacent to the collars, ring members secured to the shaft disposed within the cup washers securing the cup-shaped washers of each pair together, the open sides of the outer cup-shaped washers engaging said wear plates providing outer grease compartments with the wear plates, and a tubular bushing mounted on the shaft between the inner cup-shaped washers with the ends of the bushing closing the open ends of the inner cup-shaped washers providing inner grease compartments with the ends of the bushing.

HJALMAR L. BLOMGREN.

REFERENCES CITED

The following references are of record in the file of this patent:

UNITED STATES PATENTS

| Number | Name | Date |
|---|---|---|
| 537,172 | Albrecht | Apr. 9, 1895 |
| 970,627 | Lawson | Sept. 20, 1910 |
| 1,362,039 | Porteous | Dec. 14, 1920 |
| 1,607,524 | Garrod | Nov. 16, 1926 |

FOREIGN PATENTS

| Number | Country | Date |
|---|---|---|
| 123,654 | Great Britain | of 1919 |